(12) United States Patent
Sanchez

(10) Patent No.: US 12,406,457 B1
(45) Date of Patent: Sep. 2, 2025

(54) SYSTEMS, METHODS, AND DEVICES FOR BROWSER BASED VIRTUAL ENVIRONMENT EDITOR

(71) Applicant: Meetkai Inc., Marina Del Rey, CA (US)

(72) Inventor: Anthony Sanchez, Marina Del Rey, CA (US)

(73) Assignee: Meetkai Inc., Marina Del Rey, CA (US)

( * ) Notice: Subject to any disclaimer, the term of this patent is extended or adjusted under 35 U.S.C. 154(b) by 215 days.

(21) Appl. No.: 18/233,101

(22) Filed: Aug. 11, 2023

Related U.S. Application Data

(60) Provisional application No. 63/397,311, filed on Aug. 11, 2022.

(51) Int. Cl.
| | |
|---|---|
| *G06T 19/20* | (2011.01) |
| *G06F 21/62* | (2013.01) |
| *G06T 19/00* | (2011.01) |
| *G06V 10/54* | (2022.01) |

(52) U.S. Cl.
CPC .......... *G06T 19/20* (2013.01); *G06F 21/6218* (2013.01); *G06T 19/006* (2013.01); *G06V 10/54* (2022.01); *G06F 2221/2141* (2013.01); *G06T 2219/024* (2013.01); *G06T 2219/2004* (2013.01)

(58) Field of Classification Search
None
See application file for complete search history.

(56) References Cited

U.S. PATENT DOCUMENTS

| | | | |
|---|---|---|---|
| 7,995,053 B2 * | 8/2011 | Ohtani | G06T 11/40 |
| | | | 345/441 |
| 9,520,002 B1 * | 12/2016 | Gavriliuc | H04L 51/52 |
| 9,665,951 B2 * | 5/2017 | Rasmusson | G06T 15/04 |
| 10,990,505 B2 * | 4/2021 | Papp | G06F 11/3624 |
| 11,024,098 B1 * | 6/2021 | Drake | G06T 19/006 |

* cited by examiner

*Primary Examiner* — Robert J Craddock
(74) *Attorney, Agent, or Firm* — Command IP LLP; Pejman Yedidsion

(57) ABSTRACT

Systems, devices, and methods include: an input capture component, a real time editing consensus component, a 2D/3D items optimizer component, an environment modification component, and a virtual environment rendering component, where the disclosed embodiments determine a virtual environment rendering including different textures and objects in real time based on modified virtual environment and optimized items for displaying on an output device thereby providing a browser based virtual environment editor running on a computing device.

20 Claims, 12 Drawing Sheets

SYSTEMS, METHODS, AND DEVICES FOR BROWSER BASED VIRTUAL ENVIRONMENT EDITOR

CROSS-REFERENCE TO RELATED APPLICATION

This application claims priority to and the benefit of U.S. Provisional Patent Application No. 63/397,311, filed Aug. 11, 2022, the contents of which are hereby incorporated by reference herein for all purposes.

TECHNICAL FIELD

Web browsers are application software for accessing the World Wide Web, Web3, or a local website. When a user requests a web page from a particular website, the web browser retrieves the necessary content from a web server and then displays the page on the user's device.

BACKGROUND

Websites containing virtual reality (VR) content have begun to take off recently. Initially, there were APIs which allowed developers and designers to create seamless immersive realities in the browser. As of late, group standards have included more functionality for, for example, AR (Augmented Reality), into the framework, allowing more possibilities with a single tool on a web browser.

Infrastructures are needed to be built for VR websites and the supporting browsers in order to work seamlessly across VR devices and/or products. Interactions and transitions need to be smooth so that users can use VR devices and a VR enabled browser to interact with the virtual environment. Accordingly, accessibility to VR websites via web browsers providing beautiful aesthetics and virtual experiences for different users having different devices and capabilities operating on different computing devices is needed.

SUMMARY

A method embodiment may include: receiving, by a computing device having a processor and addressable memory, one or more user input data from a set of input capture devices for a virtual environment including a set of items; determining, by the computing device, whether user input data received from multiple users conflicts with each other, where the received user input data of each user of the multiple users may be associated with an item of the set of items in the virtual environment and where conflict may be determined based on the received user input data from two or more users being associated with a selected item; determining, by the computing device, a real time editing consensus for a determined conflict via resolving which user input data associated with a particular user to accept and which user input data to discard, the resolving being based on a set of criteria; optimizing, by the computing device, the selected item of the set of items where the optimized version of the selected item from the set of items may be received from a 2D/3D optimizer thereby taking up less memory, as compared to a non-optimized version of the selected item, while retaining or improving visual realism of the selected item; modifying, by the computing device, the virtual environment based on the determined real time editing consensus and the optimized selected item of the set of items, where the modifying may be based on receiving multiple user inputs requesting movement and changes to items in the virtual environment; and determining, by the computing device, a virtual environment rendering including different textures and objects in real time based on the modified virtual environment being optimized for displaying on an output device, thereby providing a browser based virtual environment editor running on the computing device.

In additional method embodiments, determining a real time editing consensus may be based on a set of criteria comprising at least one of: latency stats associated with each user of the multiple users and user-environment authorization or permission associated with each user of the multiple users. In additional method embodiments, the associated user latency stats may be used to determine whether certain actions by users may be unreliable. In additional method embodiments, determining whether certain actions by users may be unreliable may be based on reliability and unreliability of a user connection according to network factors. In additional method embodiments, the user-environment authorization or permissions may be used to determine permissions of users and their access to make modifications to objects or scenes. Additional method embodiments may include: determining whether to invalidate certain user actions based on the unreliability of a user connection and the user-environment authorization or permissions of users and their access to make modifications to objects or scenes.

In additional method embodiments, the input capture devices comprise at least one of: mouse, keyboard, VR controller, and augmented reality input. In additional method embodiments, optimizing the selected item of the set of items may be based on at least one of: reducing polygon count of 3D Model for the item and creating realistic looking textures for the item. In additional method embodiments, determining the virtual environment may be further based on at least one of: masking any parts of a scene that may be not within view of a user view lens and predicting portions of a scene that have not yet loaded. In additional method embodiments, the received user input data from two or more users being associated with a selected item may be for the same item.

A system embodiment may include: an input capture component configured to: receive one or more user input data for virtual environment including a set of items, where the input capture devices comprise at least one of: mouse/keyboard/VR controller and augmented reality input; a real time editing consensus component configured to: determine whether user input data has been received from multiple users where the input data may be associated with an item of the set of items that may be the same as another item of the set of items in the virtual environment and where the input data results in a conflict with each other; and determine for a resulted conflict a real time editing consensus via resolving which input associated with a particular user to accept and which input to discard, the resolving based on a set of criteria; a 2D/3D items optimizer component configured to: optimize the item of the set of items where the optimized version of the item from the set of items takes up less memory while retaining or improving visual realism of the item; an environment modification component configured to: modify the virtual environment based on the determined real time editing consensus and the optimized item of the set of items, where the modification may be based on receiving multiple user inputs requesting movement and changes to items in the virtual environment; and a virtual environment rendering component configured to: determine a virtual environment rendering including different textures and objects in real time based on the modified virtual environment being optimized for displaying on an output device.

In additional system embodiments, the set of criteria to determine a real time editing consensus comprises at least one of: latency stats associated with each user of the multiple users and user-environment authorization or permission associated with each user of the multiple users. In additional system embodiments, the associated user latency stats may be used to determine whether certain actions by users may be unreliable. In additional system embodiments, to determine whether certain actions by users may be unreliable may be based on reliability and unreliability of a user connection according to network factors. In additional system embodiments, the user-environment authorization or permissions may be used to determine permissions of users and their access to make modifications to objects or scenes. In additional system embodiments, the real time editing consensus component may be further configured to: determine whether to invalidate certain user actions based on the unreliability of a user connection and the user-environment authorization or permissions of users and their access to make modifications to objects or scenes.

In additional system embodiments, the 2D/3D items optimizer component may be further configured to: optimize the item of the set of items based on at least one of: reduce polygon count of 3D Model for the item and create realistic looking textures for the item. In additional system embodiments, the virtual environment rendering component may be further configured to: determine the virtual environment based on at least one of: mask any parts of a scene that may be not within view of a user view lens and predict portions of a scene that have not yet loaded. In additional system embodiments, the input data results in a conflict with each other when the received user input data from two or more users may be associated with the same selected item.

A computing device embodiment may include a processor and addressable memory, where the processor may be configured to: receive one or more user input data for a virtual environment including a set of items from a set of input capture devices; determine whether user input data has been received from multiple users where the input data may be associated with an item of the set of items that may be the same as another item of the set of items in the virtual environment, and where the input data of the multiple users results in a conflict with each other; determine a real time editing consensus via resolving which input associated with a particular user to accept and which input to discard, the resolving based on a set of criteria; optimize the item of the set of items where the optimized version of the item from the set of items may be received from a 2D/3D optimizer thereby taking up less memory, as compared to a non-optimized version of the selected item, while retaining or improving visual realism of the item; modify the virtual environment based on the determined real time editing consensus and the optimized item of the set of items, where the modification may be based on receiving multiple user inputs requesting movement and changes to items in the virtual environment; and determine a virtual environment rendering including different textures and objects in real time based on the modified virtual environment that may be optimized for displaying on an output device, thereby providing a browser based virtual environment editor running on the computing device.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which.

DETAILED DESCRIPTION

Figure 1:
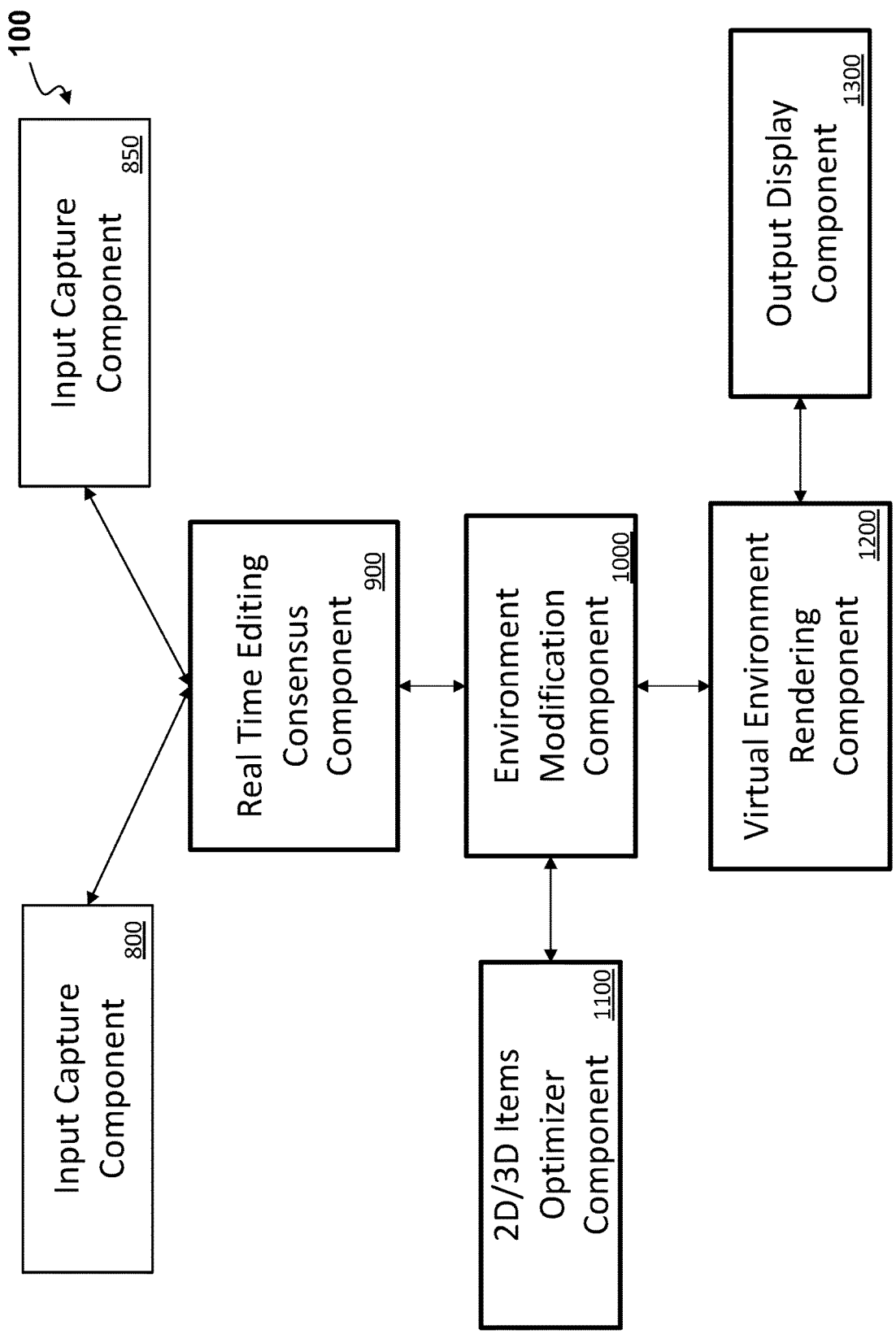
FIG. 1 depicts a high level functional block diagram of the different components within the browser based virtual environment editor systems, devices, and methods.

The following detailed description describes the present embodiments with reference to the drawings. In the drawings, reference numbers label elements of the present embodiments. These reference numbers are reproduced below in connection with the discussion of the corresponding drawing features. The described technology concerns one or more methods, systems, apparatuses, and mediums storing processor-executable process steps to execute a browser based virtual environment editor that provides experiences for multi-user real time editing of 2D/3D assets from within a browser.

Virtual reality (VR) describes a computer-generated three-dimensional environment where users interact with objects or other users. In some VR related scenarios, users are placed inside an experience, where during the experience the system stimulates multiple senses, such as vision, hearing, and touch. Virtual reality may be experienced using headsets, which take over the user's vision to simulate the computer-generated three-dimensional environment, replacing the real-world with a virtual one. VR headsets may communicate with the system via a cable or wirelessly and include motion tracking sensors to track user movement, thus enabling a 360-degree world. VR headsets may also connect to smartphones which now provide an even more real-world experience using the smartphone's motion sensors and other built in sensors in conjunction with the VR headset.

Additionally, augmented reality is a subset of virtual reality that simulates artificial objects within the real-world, meaning the virtual objects interact with real-world objects. Using a smartphone camera the system may superimpose additional information on top of the user's real-world environment. This may also be experienced on a computer screen having the ability to display 3D objects or other such similar devices. Augmented reality may be as immersive as a virtual reality experience given that augmented reality builds an experience based on live surroundings. Augmented reality provides an enhanced version of the real physical world that is achieved through the use of digital visual elements, sound, or other sensory stimuli and often times uses mobile computing power for executing the code.

Augmented reality and virtual reality systems execute applications in which users immerse themselves into an alternate reality environment when wearing a head-mounted display that displays virtual and/or augmented reality user experiences. Accordingly, a computerized method for viewing an augmented reality environment comprises generating a unique environment corresponding to a user and rendering the unique environment on the user device for them to interact with. Such systems and methods utilize broadcasting of information formatted for reception by a user device. The broadcast information is based at least in part on the unique experiences for that user and certain preferences.

Generally, the Operating System (OS) of a computing device does not allocate or allow high usage of the overall processing power of the central processing unit (CPU) to browsers being executed. That is, browsers do not use much CPU power but may use the computing device's random access memory (RAM). Browsers may support execution of code to make it possible to experience VR agnostic of the computing device and create immersive 3D, virtual reality experiences for the browser. Accordingly, embodiments of the present application provide a set of components to execute a series of steps to provide multi-user real time editing using the browser as an editor where the user, via the computing device, may render a virtual environment in real time and in the virtual world. Such interactive editing experiences include editing of optimized 2D/3D assets or items for the browser, where in the disclosed embodiments, such experiences may be executed by the computing device from within the browser. For example, the virtual environment may be displayed on a display device of a user by a virtual reality supported browser running on a computing device, and may be connected as a network client. In one embodiment, the VR supported browser may retrieve the data for the virtual reality representations from a set of virtual reality data servers (VR data servers) that may be connected to the browser by network connections. As will be described further, the network connections may be through a Local Area Network (LAN) or a global network such as the Internet and done via wire or wireless means.

The embodiments surrounding the browser based virtual environment editor may be executed to optimize the streaming of objects to be used for rendering a virtual environment of an application running on the computing device. This may be performed in the 3D virtual space environment through the use of the disclosed system embodiments, where the system may be configured to optimize 2D/3D assets or items for editing within a VR supported browser environment. The disclosed methods of editing assets or items within a VR supported browser environment may include uniquely placing said assets or items in the 3D virtual space environment where different users may interact with different assets or items in the same environment and in real time. Additionally, the introduction of new assets or items for interaction with a set of users in one virtual space may be implemented by the disclosed systems and processes. Accordingly, the disclosed embodiments for browser based virtual environment editing may allow virtual worlds to come into being and bring together AR and VR on the web to make them more convenient and widely accessible.

FIG. 1 depicts a high level functional block diagram of the different components within the browser based virtual environment editor 100, systems, devices, and methods thereof. In some embodiments, the system may optimize the streaming of objects to be used for rendering a virtual world of a computer graphics application by executing the following components. In one embodiment, the browser based virtual environment editor 100 may receive input from multiple users, for example, User 1 via an Input Capture Component 800 and User 2 via an Input Capture Component 850. The Input Capture Components 800 and 850 may be any controller or device configured to capture VR/AR input data from a user. While this figure shows Input Capture Components 800 and 850 for User 1 and User 2 respectively, the disclosed embodiments are configured to receive input data from one or more set of users as participating and/or being part of the virtual environment. As described in further detail herein, the system receives input from multiple users meaning that multiple users may be acting or interacting with an object or item in the virtual environment at the same time. Accordingly, the system is configured to resolve any conflicts arising from multiple users input on the same item via a Real Time Editing Consensus Component 900 by initially determining whether a conflicting input data has been received from multiple users. The Real Time Editing Consensus Component 900 may determine, from a set of input data resulting in a conflict with each other, which input associated with a particular user to accept and which input to discard based on a set of criteria. Once the conflict has been resolved and the system determines which input to act on in the virtual environment, the resulting determined input may be transmitted to an Environment Modification Component 1000. In one embodiment, the Environment Modification Component 1000 may also receive an optimized version of the item from a 2D/3D Items Optimizer Component 1100. The Environment Modification Component 1000 may be configured to determine a set of modifications to the virtual environment, in real time, based on receiving input from the Real Time Editing Consensus Component 900 and the 2D/3D Items Optimizer Component 1100. In order to process multiple inputs requesting movement and/or changes to items in the virtual environment, the system is configured to use optimized versions of the items to reduce processor and memory usage by the computer implemented instructions being executed. The system may determine a rendering of a virtual environment that includes different textures and objects in real time, via a Virtual Environment Rendering Component 1200 and based on the modifications received from the Environment Modification Component 1000. Once the edited virtual environment is rendered, the edited virtual environment may then be sent to an Output Display Component 1300 for displaying to the user.

The described high level functional block diagram allows multi user modifications via an editor and in real time based on resolving conflicts and optimizing objects/items in the environment. That is, as described in more detail below, the disclosed embodiments configure a computing device to execute modifications to virtual environments and render such virtual environments using a reduced amount of resources, e.g., CPU and memory, thereby providing real time editing via a browser.

Figure 2:
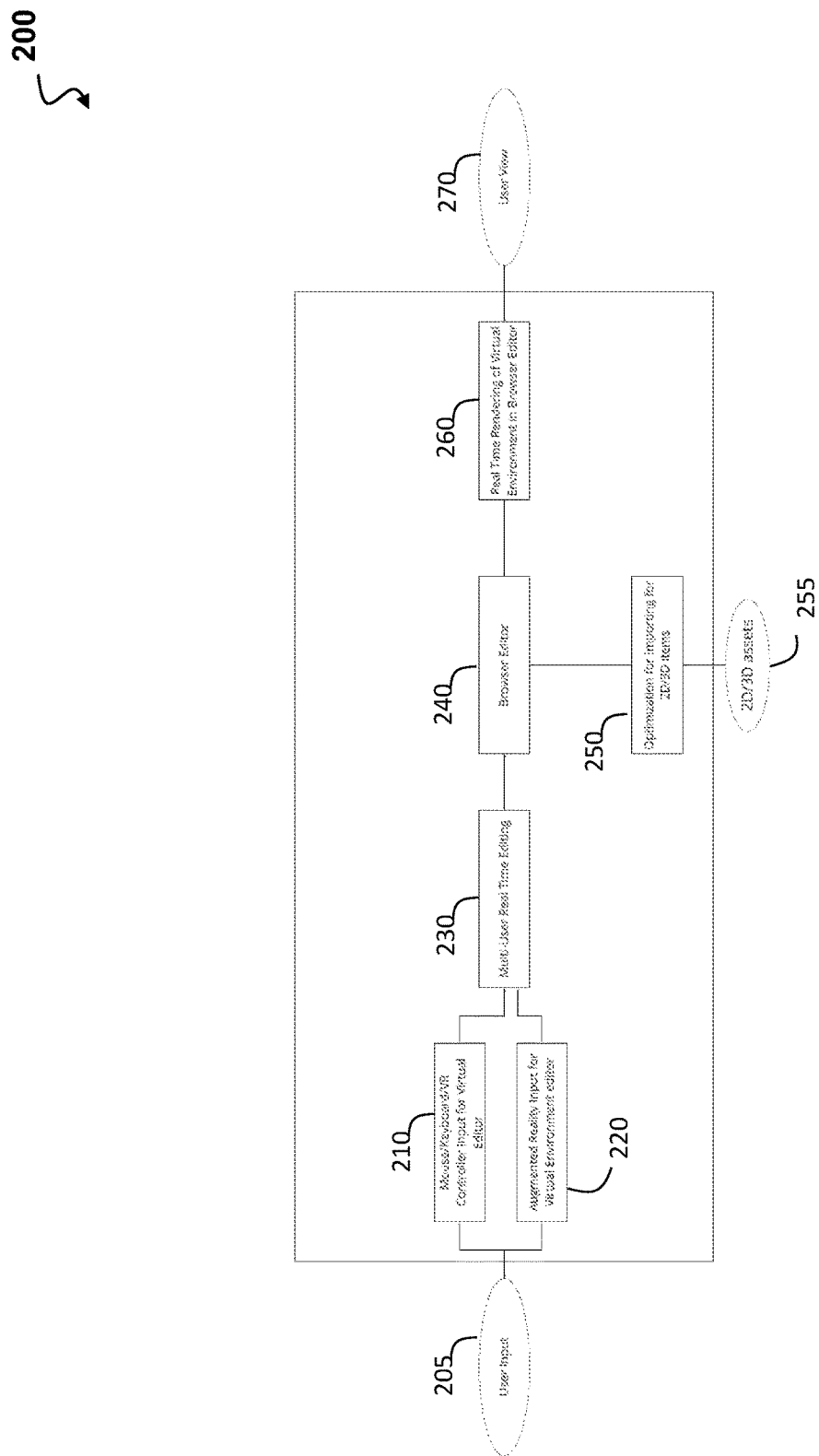
FIG. 2 depicts an example of a flow of the different component execution and data transmission as part of the communication between components for the browser based virtual environment editor system embodiment.

FIG. 2 depicts an example of a flow of the different component execution and data transmission as part of the communication between components for the browser based virtual environment editor system 200. According to the disclosed embodiments, the browser based virtual environment editor system 200 is configured to generate a real time rendering of virtual environment from within a browser editor. The virtual environment, as described above, may include a user where the user is within a virtual environment and the virtual environment receives user input 205 for processing; the system may receive the user input 205 as either Mouse/Keyboard/VR Controller Input for Virtual Editor 210 (see also component 800 in FIG. 8) or Augmented Reality Input for Virtual Environment Editor 220 (see also component 900 in FIG. 12). The system 200 may automatically determine whether the user input 205 is configured to be routed to either component (210 or 220) based on whether the input is received from a mouse, keyboard, VR controller, or the like (to executed the Mouse/Keyboard/VR Controller Input for Virtual Editor 210) or AR, 3D lenses, AR Tracking Unit, or the like (to execute the Augmented Reality Input for Virtual Environment Editor 220). In some embodiments, the user input 205 may be received from multiple users at the same time or close proximity in time, and there may be multiple user input as Mouse/Keyboard/VR Controller Input for Virtual Editor 210 and/or multiple user input as Augmented Reality Input for Virtual Environment Editor 220.

In one embodiment, a Multi-User Real Time Editing component 230 may receive as input the requested environment modifications from the Mouse/Keyboard/VR Controller Input for Virtual Editor 210 or Augmented Reality Input for Virtual Environment Editor 220, or both, and to ensure no conflicts are present with the inputs collected from different users, e.g., User 1, 2, . . . . N, determine a consensus of environment modifications for the particular asset or item. Once a final state of the program, e.g., requested environment modifications, is determined then that request may be transmitted to the Browser Editor component 240. The Browser Editor component 240 is also configured to receive an optimized 2D/3D item based on input from an Optimization for Importing for 2D/3D items component 250, where the Optimization for Importing for 2D/3D items component 250 may execute taking/receiving as input a 2D/3D asset 255 (or object in the virtual environment) and optimize the asset for the Browser Editor 240 which, as described earlier, possesses lower CPU usage abilities and hence reduced processing power. Subsequent to the asset having been optimized, the user may then make modifications and editions to the 2D/3D asset 255 within the virtual environment directly in the Browser Editor 240. In some embodiments, the optimized 2D/3D asset may be edited and transmitted to a Real Time Rendering of Virtual Environment component 260 to output to a device for user view 270. The system may be configured to continuously, and in a loop, execute the user input 205 and output user view 270 for a real time experience.

Figure 3:
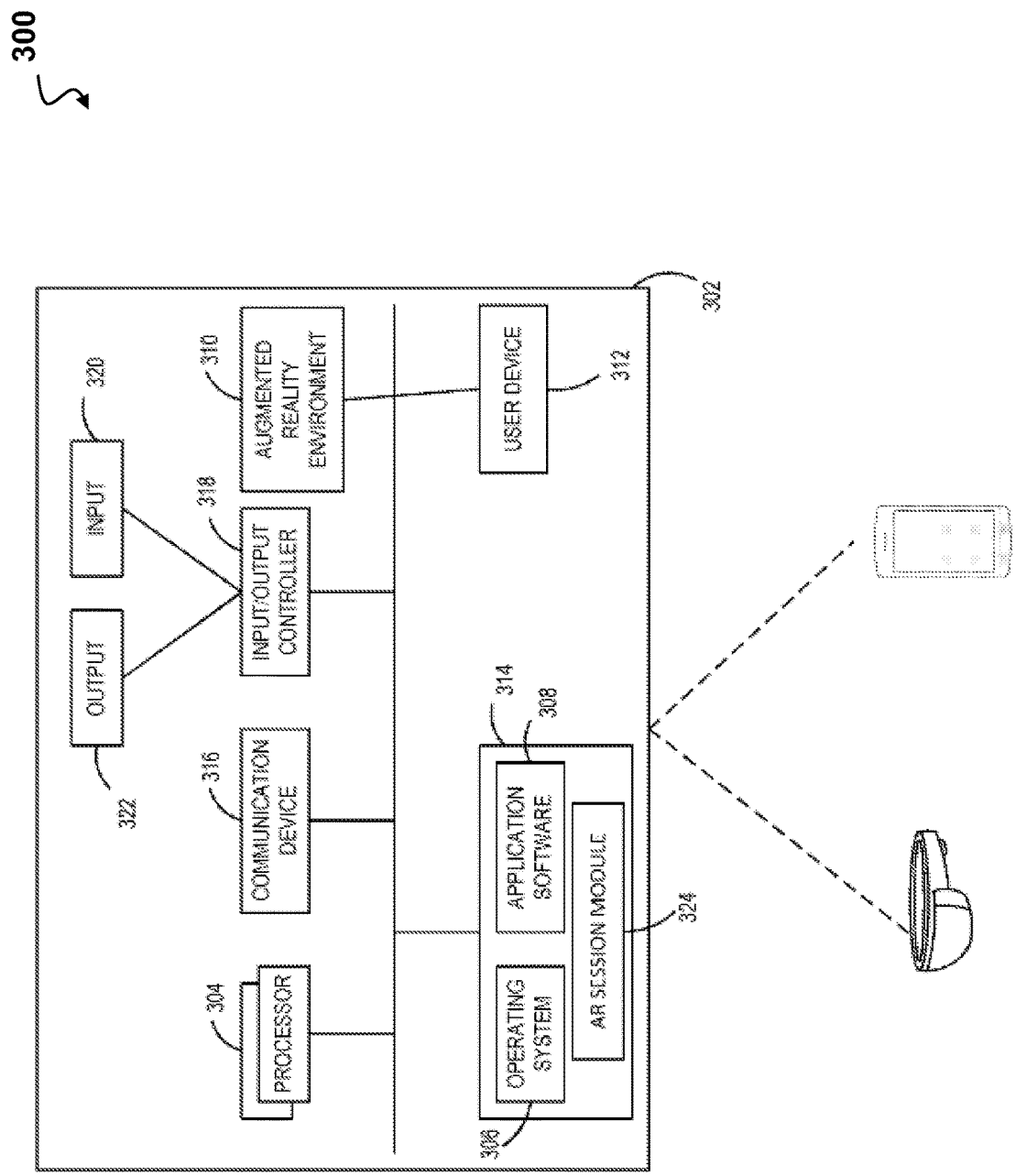
FIG. 3 depicts a functional block diagram representing the different components in the browser based virtual environment editor.

FIG. 3 depicts a functional block diagram representing the different components in the browser based virtual environment editor. The disclosed embodiments may be operable with a computing apparatus 302 according to an embodiment as a functional block diagram 300. In one example, components of the computing apparatus 302 may be implemented as a part of an electronic device according to one or more embodiments described in this specification. The computing apparatus 302 may include one or more processors 304 which may be microprocessors, controllers or any other suitable type of processors for processing computer executable instructions to control the operation of the electronic device. Platform software comprising an operating system 306 or any other suitable platform software may be provided on the apparatus 302 to enable application software 308 to be executed on the device. According to an embodiment, viewing of an augmented reality environment 310 from a user device 312 may be executed by software running on a special machine. The computing apparatus 302 may further include an augmented reality (AR) session component 324. It should be noted that the AR session component 324 may be within one or more of the user device 312, a VR headset, or other components of the various examples. The AR session component 324 may be configured to perform operations or methods described herein, including, for example, to initialize, authenticate and/or join the user device 312 (e.g., smartphone or tablet) to the VR headset operating as an augmented reality device. An addressable memory 314 may store, among other data, one or more applications or algorithms that include data and executable instructions. The applications, when executed by the processor, operate to perform functionality on the computing device. Examples of such applications include augmented reality applications and/or components, such as the AR session component 324, for example.

In some examples, the computing apparatus 302 detects input 320, for example, voice input, user gestures, or other user actions and provides a natural user interface (NUI). This user input may be used to author electronic ink, view content, select ink controls, play videos with electronic ink overlays, and for other purposes. The input/output controller 318 outputs data to output devices 322 other than a communication device 316 or display device in some examples, e.g. a locally connected printing device. NUI technology enables a user to interact with the computing apparatus 302 in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

The techniques introduced below may be implemented by programmable circuitry programmed or configured by software and/or firmware, or entirely by special-purpose circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

FIGS. 1-12 and the following discussion provide a brief, general description of a suitable computing environment in which aspects of the described technology may be implemented. Although not required, aspects of the technology may be described herein in the general context of computer-executable instructions, such as routines executed by a general- or special-purpose data processing device (e.g., a server or client computer). Aspects of the technology described herein may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer-implemented instructions, data structures, screen displays, and other data related to the technology may be distributed over the Internet or over other networks (including wireless networks) on a propagated signal on a propagation medium (e.g., an electromagnetic wave, a sound wave, etc.) over a period of time. In some implementations, the data may be provided on any analog or digital network (e.g., packet-switched, circuit-switched, or other scheme).

The described technology may also be practiced in distributed computing environments where tasks or modules are performed by remote processing devices, which are linked through a communications network, such as a Local Area Network ("LAN"), Wide Area Network ("WAN"), or the Internet. In a distributed computing environment, program modules or subroutines may be located in both local and remote memory storage devices. Those skilled in the relevant art will recognize that portions of the described technology may reside on a server computer, while corresponding portions may reside on a client computer (e.g., PC, mobile computer, tablet, or smart phone). Data structures and transmission of data particular to aspects of the technology are also encompassed within the scope of the described technology.

Figure 4:
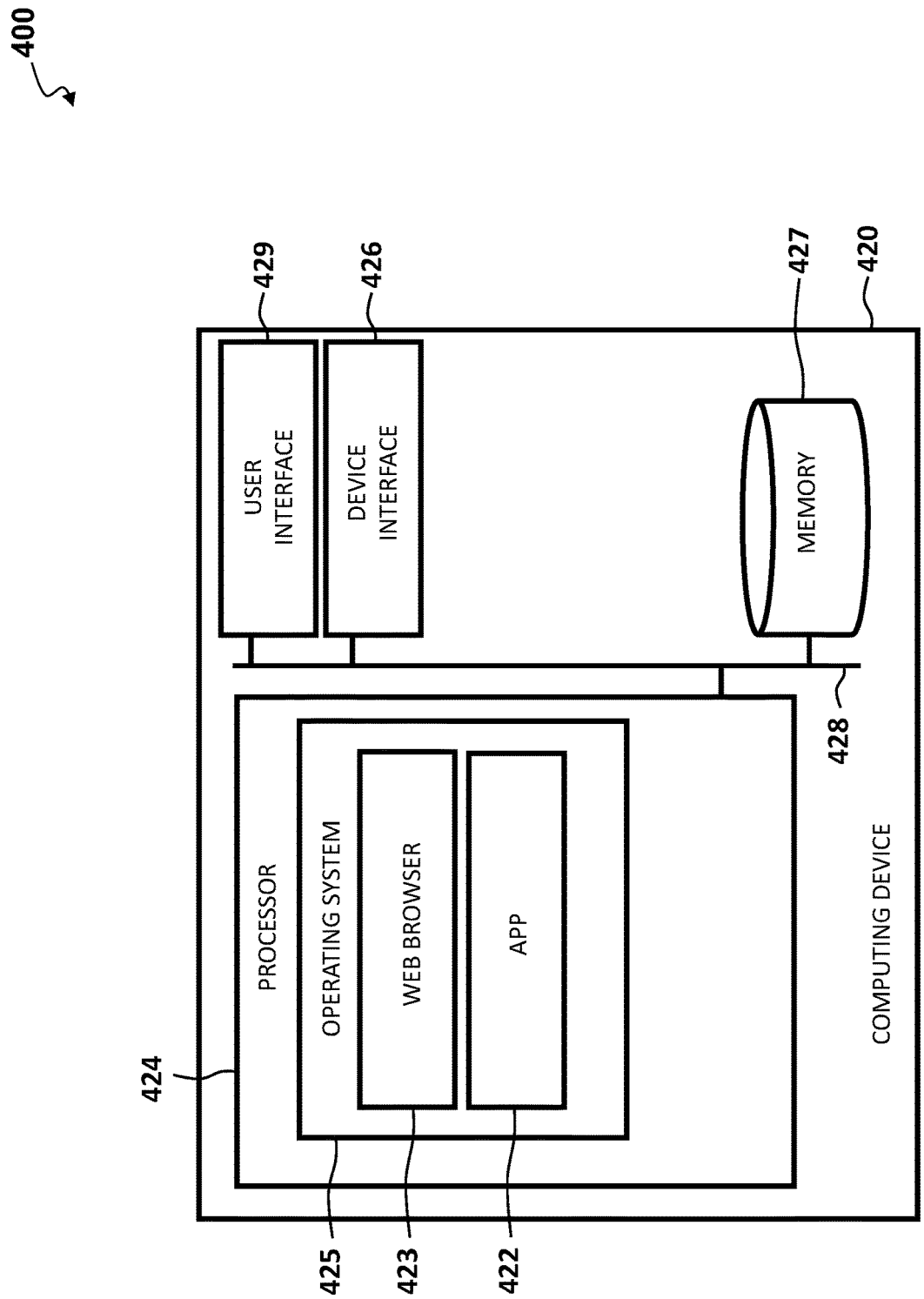
FIG. 4 illustrates an example of a top-level functional block diagram of a computing device embodiment.

FIG. 4 illustrates an example of a top-level functional block diagram of a computing device embodiment 400. The example operating environment is shown as a computing device 420 comprising a processor 424, such as a central processing unit (CPU), addressable memory 427, an external device interface 426, e.g., an optional universal serial bus port and related processing, and/or an Ethernet port and related processing, and an optional user interface 429, e.g., an array of status lights and one or more toggle switches, and/or a display, and/or a keyboard and/or a pointer-mouse system and/or a touch screen. Optionally, the addressable memory may include any type of computer-readable media that can store data accessible by the computing device 420, such as magnetic hard and floppy disk drives, optical disk drives, magnetic cassettes, tape drives, flash memory cards, digital video disks (DVDs), Bernoulli cartridges, RAMs, ROMs, smart cards, etc. Indeed, any medium for storing or transmitting computer-readable instructions and data may be employed, including a connection port to or node on a network, such as a LAN, WAN, or the Internet. These elements may be in communication with one another via a data bus 428. In some embodiments, via an operating system 425 such as one supporting a web browser 423 and applications 422, the processor 424 may be configured to execute steps of a process establishing a communication channel and processing according to the embodiments described above.

Figure 5:
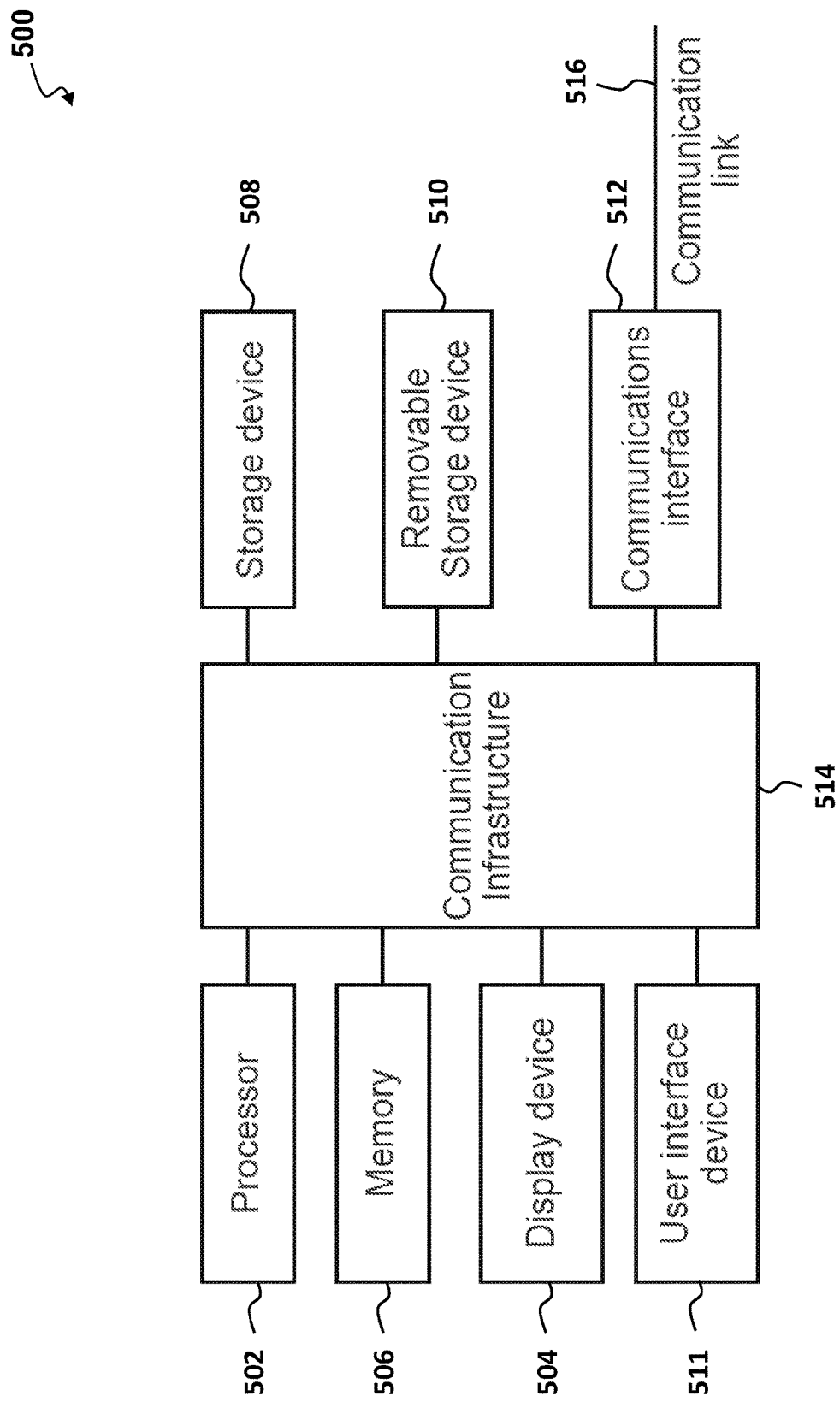
FIG. 5 is a high-level block diagram showing a computing system comprising a computer system useful for implementing an embodiment of the system and process.

FIG. 5 is a high-level block diagram 500 showing a computing system comprising a computer system useful for implementing an embodiment of the system and process, disclosed herein. Embodiments of the system may be implemented in different computing environments. The computer system includes one or more processors 502, and can further include an electronic display device 504 (e.g., for displaying graphics, text, and other data), a main memory 506 (e.g., random access memory (RAM)), storage device 508, a removable storage device 510 (e.g., removable storage drive, a removable memory module, a magnetic tape drive, an optical disk drive, a computer readable medium having stored therein computer software and/or data), user interface device 511 (e.g., keyboard, touch screen, keypad, pointing device), and a communication interface 512 (e.g., modem, a network interface (such as an Ethernet card), a communications port, or a PCMCIA slot and card). The communication interface 512 allows software and data to be transferred between the computer system and external devices. The system further includes a communications infrastructure 514 (e.g., a communications bus, cross-over bar, or network) to which the aforementioned devices/modules are connected as shown.

Information transferred via communications interface 514 may be in the form of signals such as electronic, electromagnetic, optical, or other signals capable of being received by communications interface 514, via a communication link 516 that carries signals and may be implemented using wire or cable, fiber optics, a phone line, a cellular/mobile phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Embodiments have been described with reference to flowchart illustrations and/or block diagrams of methods, apparatus (systems) and computer program products according to embodiments. Each block of such illustrations/diagrams, or combinations thereof, can be implemented by computer program instructions. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic, implementing embodiments. In alternative implementations, the functions noted in the blocks may occur out of the order noted in the figures, concurrently, etc.

Computer programs (i.e., computer control logic) are stored in main memory and/or secondary memory. Computer programs may also be received via a communications interface 512. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system.

Figure 6:
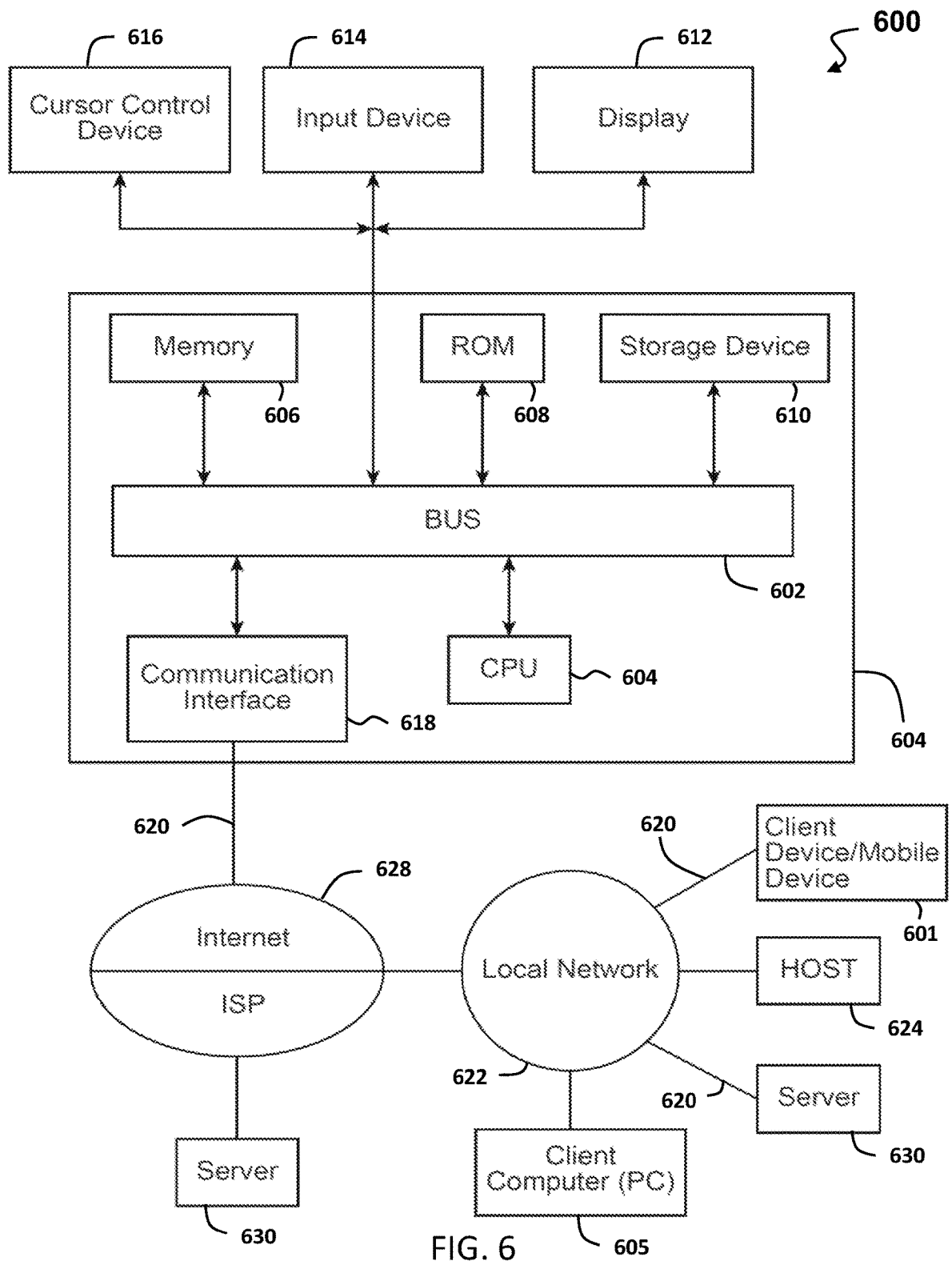
FIG. 6 shows a block diagram of an example system in which an embodiment may be implemented.

FIG. 6 shows a block diagram of an example system 600 in which an embodiment may be implemented. The system 600 includes one or more client devices 601 such as consumer electronics devices, connected to one or more server computing systems 630. A server 630 includes a bus 602 or other communication mechanism for communicating information, and a processor (CPU) 604 coupled with the bus 602 for processing information. The server 630 also includes a main memory 606, such as a random access memory (RAM) or other dynamic storage device, coupled to the bus 602 for storing information and instructions to be executed by the processor 604. The main memory 606 also may be used for storing temporary variables or other intermediate information during execution or instructions to be executed by the processor 604. The server computer system 630 further includes a read only memory (ROM) 608 or other static storage device coupled to the bus 602 for storing static information and instructions for the processor 604. A storage device 610, such as a magnetic disk or optical disk, is provided and coupled to the bus 602 for storing information and instructions. The bus 602 may contain, for example, thirty-two address lines for addressing video memory or main memory 606. The bus 602 can also include, for example, a 32-bit data bus for transferring data between and among the components, such as the CPU 604, the main memory 606, video memory and the storage 610. Alternatively, multiplex data/address lines may be used instead of separate data and address lines.

The server 630 may be coupled via the bus 602 to a display 612 for displaying information to a computer user. An input device 614, including alphanumeric and other keys, is coupled to the bus 602 for communicating information and command selections to the processor 604. Another type or user input device comprises cursor control 616, such as a mouse, a trackball, or cursor direction keys for communicating direction information and command selections to the processor 604 and for controlling cursor movement on the display 612.

According to one embodiment, the functions are performed by the processor 604 executing one or more sequences of one or more instructions contained in the main memory 606. Such instructions may be read into the main memory 606 from another computer-readable medium, such as the storage device 610. Execution of the sequences of instructions contained in the main memory 606 causes the processor 604 to perform the process steps described herein. One or more processors in a multi-processing arrangement may also be employed to execute the sequences of instructions contained in the main memory 606. In alternative embodiments, hard-wired circuitry may be used in place of or in combination with software instructions to implement the embodiments. Thus, embodiments are not limited to any specific combination of hardware circuitry and software.

The terms "computer program medium," "computer usable medium," "computer readable medium", and "computer program product," may be used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs (also called computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor multi-core processor to perform the features of the computer system. Accordingly, such computer programs represent controllers of the computer system.

Generally, the term "computer-readable medium" as used herein refers to any medium that participated in providing instructions to the processor 604 for execution. Such a medium may take many forms, including but not limited to, non-volatile media, volatile media, and transmission media. Non-volatile media includes, for example, optical or magnetic disks, such as the storage device 610. Volatile media includes dynamic memory, such as the main memory 606. Transmission media includes coaxial cables, copper wire and fiber optics, including the wires that comprise the bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 604 for execution. For example, the instructions may initially be carried on a magnetic disk of a remote computer. The remote computer can load the instructions into its dynamic memory and send the instructions over a telephone line using a modem. A modem local to the server 630 can receive the data on the telephone line and use an infrared transmitter to convert the data to an infrared signal. An infrared detector coupled to the bus 602 can receive the data carried in the infrared signal and place the data on the bus 602. The bus 602 carries the data to the main memory 606, from which the processor 604 retrieves and executes the instructions. The instructions received from the main memory 606 may optionally be stored on the storage device 610 either before or after execution by the processor 604.

The server 630 also includes a communication interface 618 coupled to the bus 602. The communication interface 618 provides a two-way data communication coupling to a network link 620 that is connected to the world wide packet data communication network now commonly referred to as the Internet 628. The Internet 628 uses electrical, electromagnetic or optical signals that carry digital data streams. The signals through the various networks and the signals on the network link 620 and through the communication interface 618, which carry the digital data to and from the server 630, are exemplary forms or carrier waves transporting the information.

In another embodiment of the server 630, interface 618 is connected to a network 622 via a communication link 620. For example, the communication interface 618 may be an integrated services digital network (ISDN) card or a modem to provide a data communication connection to a corresponding type of telephone line, which can comprise part of the network link 620. As another example, the communication interface 618 may be a local area network (LAN) card to provide a data communication connection to a compatible LAN. Wireless links may also be implemented. In any such implementation, the communication interface 618 sends and receives electrical electromagnetic or optical signals that carry digital data streams representing various types of information.

The network link 620 typically provides data communication through one or more networks to other data devices. For example, the network link 620 may provide a connection through the local network 622 to a host computer 624 or to data equipment operated by an Internet Service Provider (ISP). The ISP in turn provides data communication services through the Internet 628. The local network 622 and the Internet 628 both use electrical, electromagnetic or optical signals that carry digital data streams. The signals through the various networks and the signals on the network link 620 and through the communication interface 618, which carry the digital data to and from the server 630, are exemplary forms or carrier waves transporting the information.

The server 630 can send/receive messages and data, including e-mail, program code, through the network, the network link 620 and the communication interface 618. Further, the communication interface 618 can comprise a USB/Tuner and the network link 620 may be an antenna or cable for connecting the server 630 to a cable provider, satellite provider or other terrestrial transmission system for receiving messages, data and program code from another source.

The example versions of the embodiments described herein may be implemented as logical operations in a distributed processing system such as the system 600 including the servers 630. The logical operations of the embodiments may be implemented as a sequence of steps executing in the server 630, and as interconnected machine modules within the system 600. The implementation is a matter of choice and can depend on performance of the system 600 implementing the embodiments. As such, the logical operations constituting said example versions of the embodiments are referred to for e.g., as operations, steps or modules.

Similar to a server 630 described above, a client device 601 can include a processor, memory, storage device, display, input device and communication interface (e.g., e-mail interface) for connecting the client device to the Internet 628, the ISP, or LAN 622, for communication with the servers 630. The system 600 can further include computers (e.g., personal computers, computing nodes) 605 operating in the same manner as client devices 601, where a user can utilize one or more computers 605 to manage data in the server 630.

Figure 7:
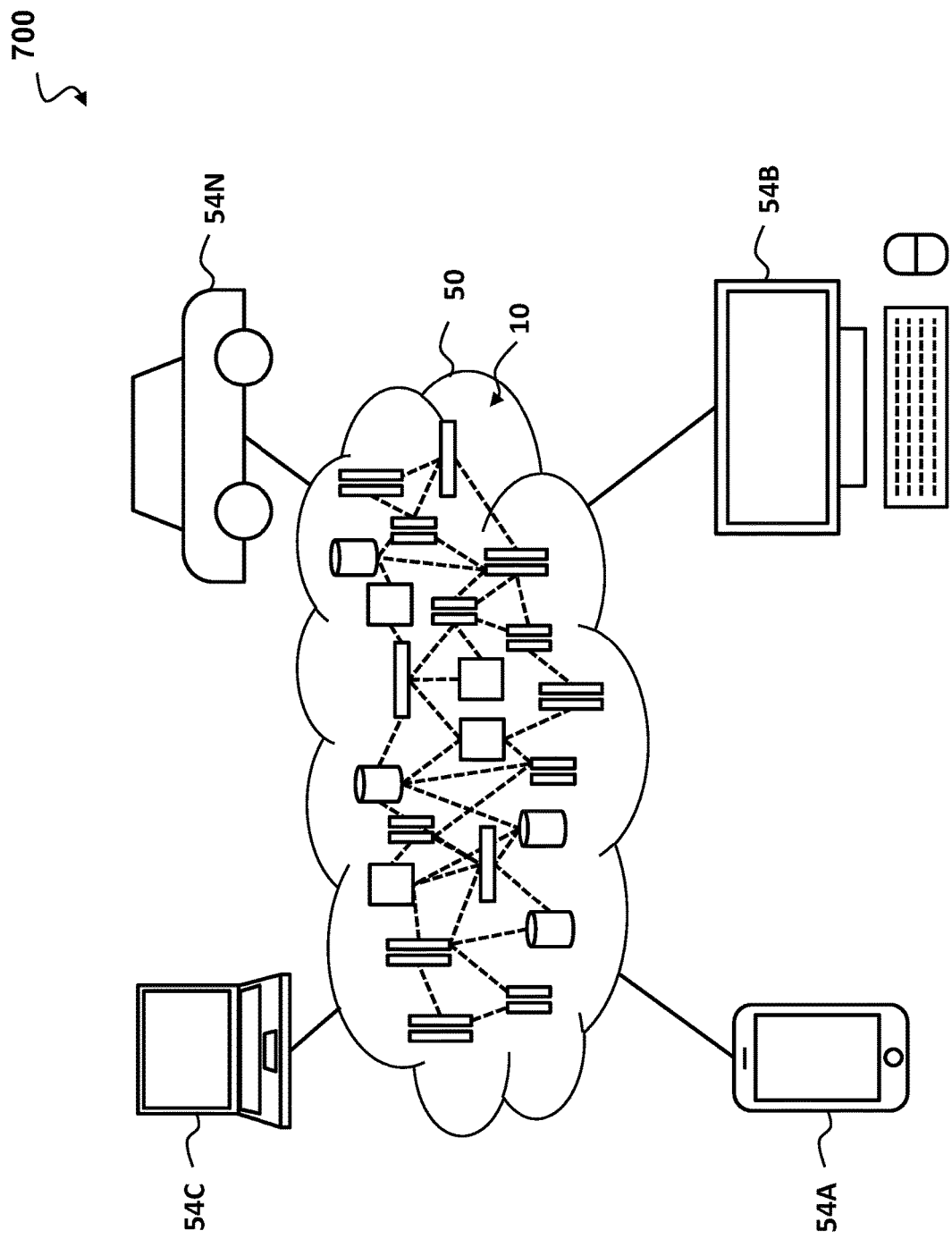
FIG. 7 depicts an illustrative cloud computing environment, according to one embodiment.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA), smartphone, smart watch, set-top box, video game system, tablet, mobile computing device, or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
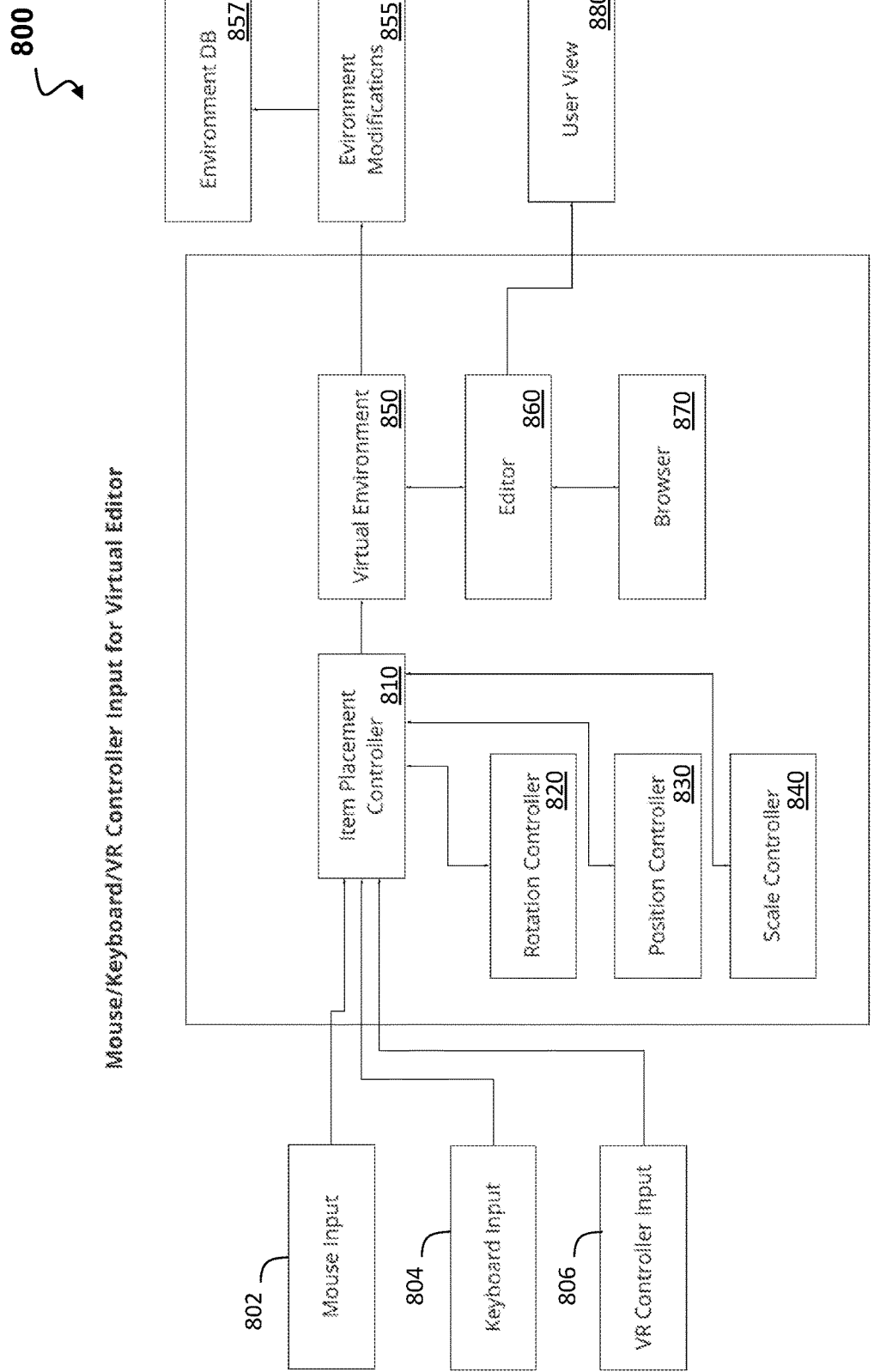
FIG. 8 depicts a functional block diagram of the browser based virtual environment editor system executing input for a virtual environment editor.

FIG. 8 depicts a functional block diagram of a computing device executing an Environment Modification component 800 where the component may be configured to receive, via an Item Placement Controller 810, input from or as a form of a Mouse Input 802, Keyboard Input 804, and/or VR Controller Input 806. In the browser based virtual environment editor embodiments, the mouse/keyboard/VR controller input may be used for the virtual editor. One example of a scenario using this component embodiment is where a user gives input from mouse/keyboard or virtual headset and controllers to modify a virtual scene of a garden by placing plants around the area. Thereafter, the user may use a mouse and keyboard to select the specific location and orientation for the plants and those objects, where those placements may then be saved and outputted to an external system that may include a database or any other receiver of the corresponding data. In this example, Mouse Input 802 may, for example, be where users provide input from a computer mouse such as left click, right click, and mouse x, y position. The Keyboard Input 804 may be the input from a computer keyboard such as key "a", "w" "down+arrow" and where the VR Controller Input 806 may be the Controller input for VR hardware such as a VR controller that provides ability to wirelessly interact with and play in VR using, for example, sensors, multi-function trackpad, dual-stage trigger, HD haptic feedback, and rechargeable battery.

The Environment Modification component 800 may be configured to execute an Item Placement Controller 810 to receive the input of user controls and use the Rotation, Position, and Scale Controller to position, rotate, and scale objects. For example, a user may select a plant to modify and the user may then move the plant 1 meter on its y axis and rotate it around its x axis by 30 degrees. To accomplish this, the Item Placement Controller 810 may be in communication with a Rotation Controller 820, a Position Controller 830, and a Scale Controller 840. In this embodiment, the Rotation Controller 820 may be configured to control rotation modification of objects, for example, rotating a tree 50 degrees on its x axis and 20 degrees on its y axis. Additionally, the Position Controller 830 may be configured to control the position modification of objects, for example, moving a water fountain in a garden scene 2 meters on the x axis and 3 meters on its z axis. Also, the Scale Controller 840 may be configured to control the scale modification of an object, for example, making a building object .2 of its current size on the x, y and z axes.

The Item Placement Controller 810 may then output an updated virtual environment to a Virtual Environment component 850 where the Virtual Environment component 850 may communicate with an Editor 860 and where the Editor 860 may be configured to provide a user interface (UI) that the user interacts with to edit the virtual environment. Any changes in the Virtual Environment component 850 are reflected in the Editor 860. In one embodiment, the Editor 860 may be executed on a browser 870, for example, Chrome®, Safari®, or any other browser, or VR supported browser environment. The edited virtual environment may be displayed to the user via a User View component 880 where any changes made in the Editor 860 may be reflected in the User View 880 component to the user in real time or near real time.

In the disclosed embodiments, the Virtual Environment component 850 may further output the virtual environment to an Environment Modifications component 855 where the Environment Modifications component 855 may be configured to output what may be defined to represent the state of changes that may be transmitted to any external system such as an Environment Data Base (DB) 857. The Environment DB 857 may then save the state of the virtual environment, for example, the position, IDs, and name of objects. According to the disclosed embodiments, a scene may be displayed to the user depicting a 3D environment such as a garden, where the scene takes in any modifications from the Item Placement Controller 810 and updates the virtual environment (via the Virtual Environment component 850). Any modifications may also be outputted to any external systems for saving/syncing purposes, for example, the modifications may be saved in a database as described above, providing a browser based virtual environment editor to be presented as experiences to the user via the system.

Figure 9:
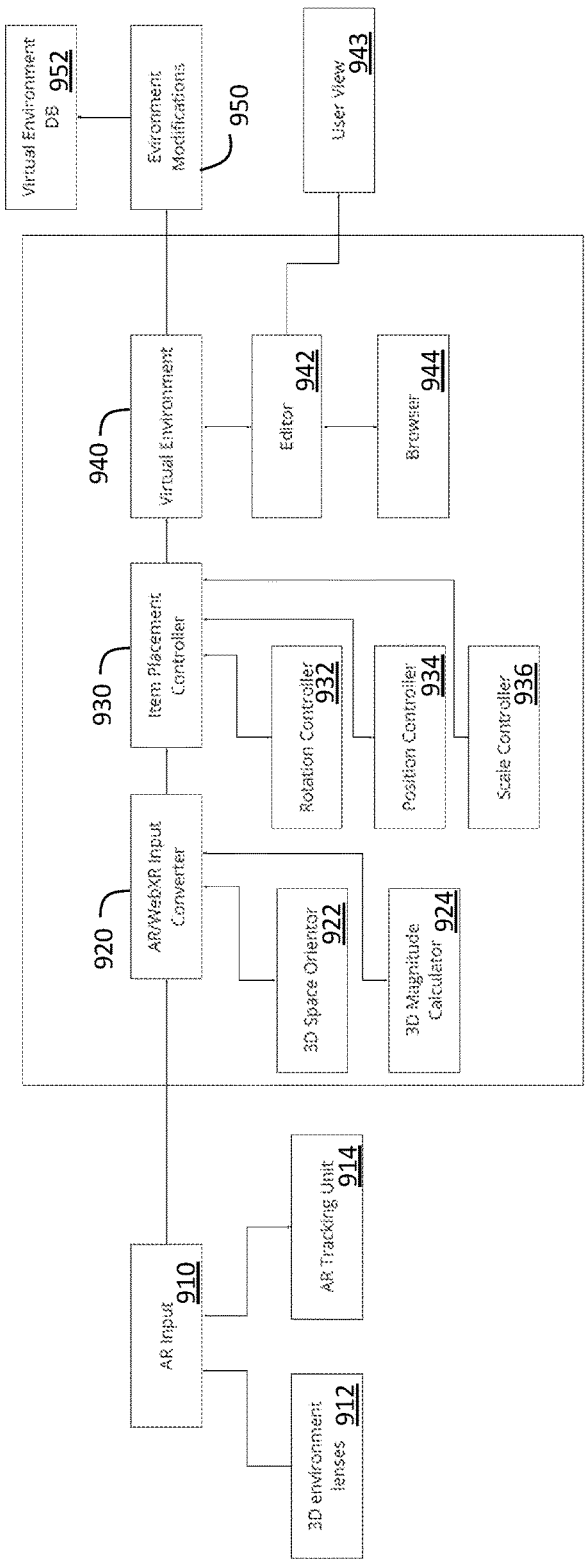
FIG. 9 depicts a functional block diagram of the browser based virtual environment editor system executing an augmented reality input for a virtual environment editor.

FIG. 9 depicts a functional block diagram of the browser based virtual environment editor system where the computing device is configured to execute an Augmented Reality (AR) Input for Virtual Environment editor 900 where a user modifies a virtual scene through AR lenses, e.g., Smart Glasses. For example, in an environment where the users are placing plants around a garden via their physical hands, they may use their hands to select specific location and orientation for the plants and those objects. Those placements may then be saved and outputted to an external system that may be a database or any other receiver of the corresponding data. In one embodiment, the system initiates by receiving AR Input 910 which represents AR Input systems, for example, Augmented Reality Smart Glass. The AR Input 910 may receive data input from an AR Tracking Unit 914, representing the unit of functionality that tracks possible input into the virtual spaces, for example, hand movements. Other embodiments have an input that may be received from 3D environment lenses 912, representing the lenses that gather the raw input to be tracked.

In one embodiment, an AR/WebXR Input Converter 920 may receive the AR Input 910 and be configured to convert the AR Input 910, for example, of hand movements, into actionable modifications in a virtual space. As an example, the AR/WebXR Input Converter 920 may take in the AR input 910 and using the 3D Space Orientor 922 and the 3D Magnitude Calculator 924 convert a user's hand gesture into a request to move an object 3 meters on the y axis. The 3D Space Orientor 922 may be configured to take the hand gestures and map the hand gestures to a set of spatial coordinates. The 3D Magnitude Calculator 924 may be configured to take the magnitude of the made hand gestures to map to appropriate magnitudes in the virtual space. For example, if the hand gestures are slow, then the scaling request is small but if the hand gestures are fast movements, the scale would increase accordingly.

In one embodiment, an Item Placement Controller 930 may be executed where the controller is configured to take in the input of user controls (from the AR/Web XR Input Converter 920) and use a Rotation Controller 932, a Position Controller 934, and a Scale Controller 936 to respectively position, rotate, and scale the object. For example, a user may select a plant to modify and then move the plant 1 meter on its y axis and rotate it around its x axis by 30 degrees. The Rotation Controller 932 may be in communication with the Item Placement Controller 930 where the Rotation Controller 932 may be configured to control rotation modification of objects, for example, rotating a tree 50 degrees on its x axis and 20 degrees on its y axis. The Position Controller 934 may also be in communication with the Item Placement Controller 930 where the Position Controller 934 may be configured to control the position modification of the objects, for example, moving a water fountain in a garden scene 2 meters on the x axis and 3 meters on its z-axis. Further, the Scale Controller 936 may also be in communication with the Item Placement Controller 930 where the Scale Controller 936 may be configured to control the scale modification of the object, for example, making a building object .2 of its current size on the x, y and z axis.

Once the item placement for one or more items is determined, a Virtual Environment 940 controller may determine a scene to be displayed to the user, the scene depicting a 3D environment such as a garden. This Virtual Environment 940 may take in any modifications from the Item Placement Controller 930 as input and update the virtual environment. Any modifications may also be outputted to any external systems for saving/syncing purposes. For example, the modifications may be saved in a database. An Editor 942 may be utilized by the Virtual Environment 940 where the editor represents a UI that the user may interact with in order to edit the virtual environment and any changes in the Virtual Environment 940 may then be reflected in the editor. That is, a User View 943 may be rendered where any changes made in the Editor 942 is reflected in the User View 943. Additionally, a Browser 944 may be used and executed, the Browser 944 representing the browser engine that the editor runs on. This may be Chrome®, Safari®, or any other browser. In one embodiment, the system may include an Environment Modifications component 950 where the Environment Modifications 950 represents the state of changes that may be sent to any external system such as a Virtual Environment DB 952. In one embodiment, the Virtual Environment DB 952 may be configured to save the state of the virtual environment, for example, the position, IDs, and name of objects.

Figure 10:
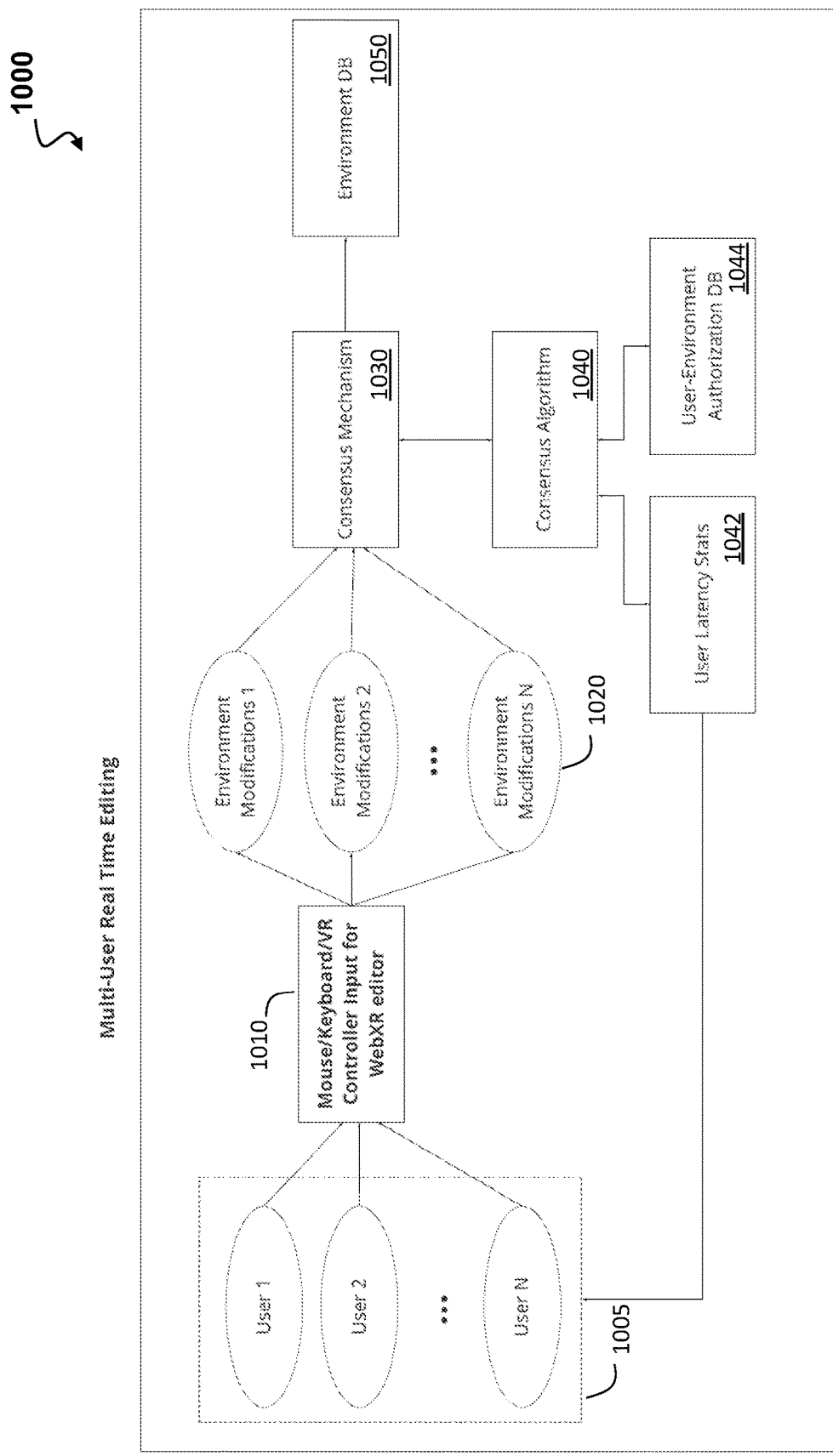
FIG. 10 depicts a functional block diagram of a multi-user real time editing system.

FIG. 10 depicts a functional block diagram of a Multi-User Real Time Editing system 1000 for the browser based virtual environment editor. The system in this embodiment may be configured to provide multiple users with editing power of the same virtual environment, all from their own devices. That is, different devices may be supported so that some users may be using a desktop and laptop while others may be using a VR Headset to edit the same virtual environment in real time or near real time. For example, this embodiment allows a team of 3D scene designers who are all using the browser editor to layout different cars in a parking lot environment. Accordingly, input from a set of users, User 1, 2, . . . . N 1005 may represent the different users accessing the browser editor. Such input may be received from Mouse/Keyboard/VR Controller input for WebXR Editor 1010 (also see FIG. 8) where the input may include a set of Environment Modifications, Environment Modifications 1, 2, . . . . N 1020 where the different modifications may represent modifications that each user is making. For example, User 1 may place a car in the first parking spot while User 2 places the same car in second parking spot. Since the Multi-User Real Time Editing system 1000 allows multiple users to make modification, conflicts may occur between certain assets in the VR environment.

In one embodiment, to address conflicts occurring due to multiple user actions, a Consensus Mechanism component 1030 may be configured to take in the modifications from a set of different users and utilize a Consensus Algorithm component 1040 to determine/decide which action is final and save the action to the Virtual Environment DB 1050. In this embodiment, the Virtual Environment DB 1050 may be configured to save the state of the virtual environment, for example, the position, IDs, and name of the objects. The Consensus Algorithm component 1040 may use a consensus algorithm to decide which action was the final action to determine the state of the program. The Consensus Algorithm component 1040 may therefore be configured to use a User-Environment Authorization DB 1044 to determine whether to invalidate certain user actions in addition to a User Latency Stats component 1042 to determine if certain user's actions are unreliable. The User Latency Stats component 1042 may determine the reliability of user connection based on network factors. This information may then be used by the Consensus Algorithm 1040 component for processing. The User Latency Stats component 1042 may be in communication with the set of different users, in real time or near real time, to collect latency statistics associated with each user of the set of users, User 1, 2, . . . . N 1005. Additionally, the User Latency Stats component 1042 may use the latency statistics to determine reliability and make other related assumptions about the user. In addition to the User Latency Stats component 1042, the system may also use a User-Environment Authorization DB 1044 which may be configured to save permissions of users and their access to make modifications to objects or scenes. The Multi-User Real Time Editing system 1000 may determine a consensus between multiple users and multiple environment modifications based on the associated user latency stats and user-environment authorization or permissions. For example, if User 1 has a slower connection than User 2, the system may accept the input and modifications from User 2 since their connection was faster and hence more reliable. Additionally, if a User 1 does not have permission to move an object out of the virtual environment, their actions may be cross verified against the authorization list and hence not accepted if they try to move the object out while at the same time, User 2 is modifying the object to stay within the virtual environment. In one embodiment, the consensus model may prioritize majority action, if changes made are by an even number of people, or using heuristics such as who has the higher internet speed and which connection is dropping least number of packets.

According to the disclosed embodiment, a set of user actions, in the form of user input (see also FIG. 2, ref. no. 205) may be received and executed by the Multi-User Real Time Editing system 1000 while resolving any conflicts and ensuring that certain 2D/3D assets (see also FIG. 2, ref. no. 255) are modified in the Browser Editor (see also FIG. 2, ref. no. 240) according to the user permissions and real time status of the modification commands. That is, the system is configured to optimize the streaming of objects to be used for rendering a virtual world of a computer graphics application while multiple users are making modifications/edits to the 2D/3D assets within the virtual environment.

In the above disclosed embodiments, the user device may be any type of display system providing a view through optics so that the generated image that is being displayed to the user is overlaid onto a real-world view. Thus, as a wearable display system, an augmented reality device can incorporate components, such as processing unit(s), computer interface(s) that provide network connectivity, and camera(s) etc. These components may be housed in the headset or in a separate housing connected to the headset by wireless or wired means. The user device may also include an imaging application implemented to generate holograms for display. The imaging application may be implemented as a software application or components, such as computer-executable software instructions that are executable with the processing system. The imaging application may be stored on computer-readable storage memory (e.g., the memory), such as any suitable memory device or electronic data storage implemented in the alternate reality device.

Figure 11:
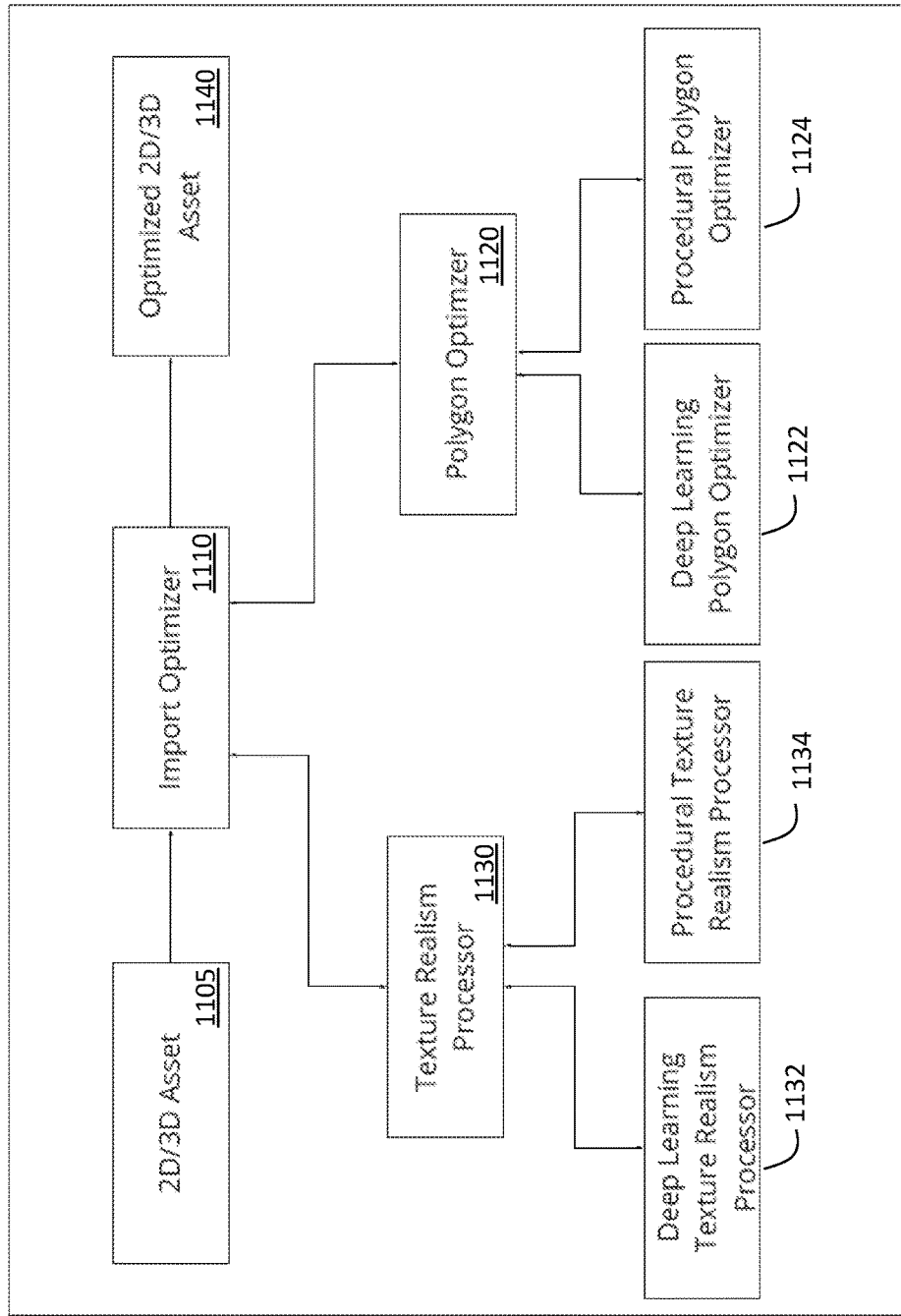
FIG. 11 depicts a functional block diagram of the browser based virtual environment editor system executing an optimization component for importing of 2D/3D items.

FIG. 11 depicts a functional block diagram of the browser based virtual environment editor system where the computing device is configured to provide Optimization for Importing for 2D/3D items 1100, to import assets into the virtual environment editor. For example, taking a 3D tree asset and importing it quickly, e.g., in a short amount of processing time and using less resources on the computing device relative to the overall program executions, into the 3D environment, where the Optimized 2D/3D Asset 1140 may be imported with less processing time and using less memory than the originally received 2D/3D Asset 1105. The system initiates by receiving a 2D/3D Asset 1105 which may be any asset to be used within a virtual scene. The 2D/3D Asset 1105 may be received by an Import Optimizer 1110 which may be configured to use two other components: a Polygon Optimizer 1120 and a Texture Optimizer 1130 (also referred to as Texture Realism Processor) to modify the asset so that the asset takes up less memory, as compared to an original non-optimized version of the asset, while retaining or improving upon its visual realism. The system may then output an Optimized 2D/3D Asset 1140. The Optimized 2D/3D Asset 1140 may be the asset that has been optimized, for example, the bark of a tree asset will look more realistic while the model itself takes less memory to store and load.

In one embodiment, the Texture Optimizer 1130 may be configured to use different algorithm modules at different steps of optimization to create realistic looking textures, for example, adding more depth to the bark texture of a tree. The Polygon Optimizer 1120 may be configured to use different algorithm modules at different steps of optimization to reduce the polygon count of 3D Model, which refers to the number of polygons being rendered per frame, while preserving the shape. For example, the system may make the polygon count go from 100 k to 45 k on a 3D tree model, where polygons are used in computer graphics to compose images that are three-dimensional in appearance. Polygon count may refer to the number of objects that make up a 3D model where the higher the polygon density of a model, the more refined it is and the smoother the surface. A high polygon count results in a higher model quality when products have many corners and angles, complex structures or when small design details are important. In one embodiment, the polygon count may be used to measure the efficiently of a model by comparing its visual quality to its count. Typically, the higher the visual quality and the lower the polygon count, the more efficient the model.

The Texture Optimizer 1130 may use a Deep Learning Texture Optimizer 1132 (also referred to as Deep Learning Texture Realism Processor) which may use deep learning neural network to optimize different features of a texture, and a Procedural Texture Optimizer 1134 (also referred to as Procedural Texture Realism Processor) which may use procedural algorithms to produce different texture options that are more realistic than input texture. For example, the Procedural Texture Optimizer 1134 may add more depth to bark texture of a tree. In one embodiment, the Polygon Optimizer 1120 may use a Deep Learning Polygon Optimizer 1122 that utilizes deep learning neural network to reduce polygon count while preserving shape, and a Procedural Polygon Optimizer 1124 that utilizes procedural algorithms to produce trim down polygons without affecting shape angles. A neural network is a method in artificial intelligence that teaches computers to process data in a way that is inspired by the human brain. The deep learning neural networks may be a machine learning process that uses interconnected nodes or neurons in a layered structure that resembles the human brain.

Figure 12:
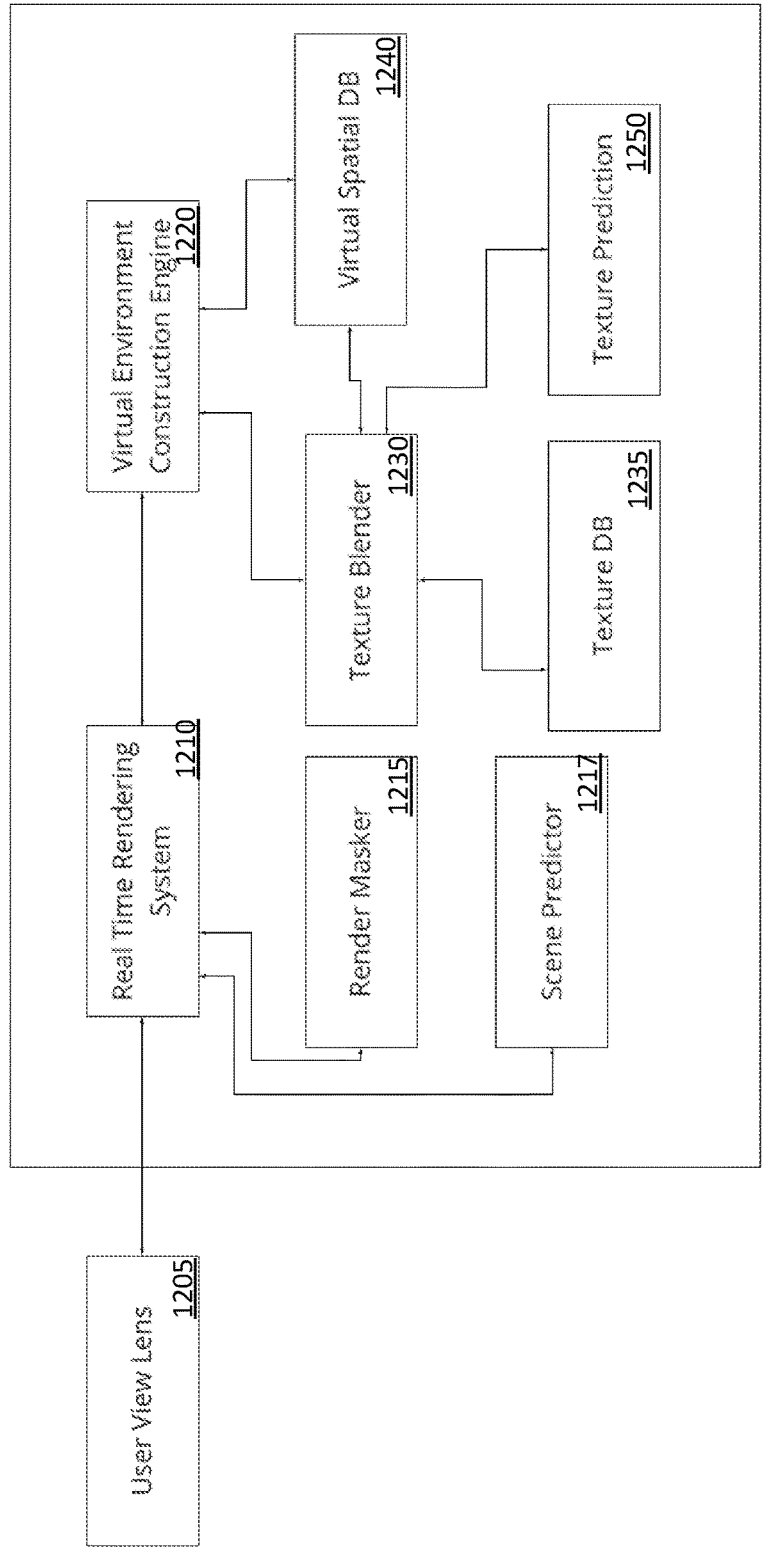
FIG. 12 depicts a functional block diagram of the browser based virtual environment editor system executing real time rendering component of virtual environment in a browser editor.

FIG. 12 depicts a functional block diagram of the Real Time Rendering of Virtual Environment in Browser Editor 1200 component where the computing device is configured to render a virtual environment that includes different textures and objects in real time, using components for optimization and configured to do so in multiple areas of rendering, texture, and scene prediction. According to this embodiment, a Real Time Rendering System 1210 may receive input from a User View Lens 1205 that represents the view the user has, where this view may be through an editor view or through a VR headset. The Real Time Rendering System 1210 may communicate with a Render Masker 1215 and a Scene Predictor 1217 to optimize the rendering of a view of the scene as will be described below.

In one embodiment, the Render Masker 1215 may be a component that masks any parts of the scene that are not within the view of the User View Lens 1205. For example, if a user is looking at a river, the river is rendered but if there is a tree behind them, the tree is not rendered to save computing power. The Scene Predictor 1217 may receive the virtual environment and predict portions of the scene that are too slow to load via traditional methods, where in some embodiments, may be defined as containing too many polygons or that the full asset is still downloading and not yet in the scene. This may be due to network conditions or the size of the asset. In another example, a far off mountain in the background may be filled in with predicted images if the assets for the mountain are still loading. In one embodiment, the Scene Predictor 1217 may be implemented using deep learning algorithm such as AutoEncoder model/General Adversarial Model or other Deep learning model, where artificial neural network is used to learn efficient coding of unlabeled data.

The Real Time Rendering System 1210 may also communicate with a Virtual Environment Construction Engine 1220 to build the scene efficiently, e.g., in less time or using less processing power/resources. The Virtual Environment Construction Engine 1220 may be configured to use a Texture Blender 1230 to place texture appropriately and load in and place objects from a Virtual Spatial DB 1235. More specifically, the Texture Blender 1230 may be configured to fuse meshes even when they may not line up with the raw textures. For example, if there is a grass texture and sand texture, the Texture Blender 1230 may blend the two textures to reduce data processing and increase efficiency. This component may create the appropriate mixture of textures to blend the two. The Texture Blender 1230 may also use a Virtual Spatial DB 1240 to identify which textures are adjacent and need or will need blending. The Texture Blender 1230 may then take those textures from the Texture DB 1235 and use the Texture Predictor 1250 to create the blended texture and provide a blended texture to the Virtual Environment Construction Engine 1220. In one embodiment, the Texture Blender 1230 may be implemented with a Deep Learning Model (where deep learning is part of a broader family of machine learning methods, which is based on artificial neural networks with representation learning). The Virtual Environment Construction Engine 1220 may use a Virtual Spatial DB 1240 that is configured to store the locations of different objects. In one embodiment, the Texture Predictor 1250 may be configured to take in N amount of textures and produce a blended texture, for example, the Texture Predictor 1250 may take in a sand texture and a grass texture, and then blend the grass texture with the sand between spots across it. This component may also be implemented with a deep learning model to learn a representation for a set of data, in this case for texture calculation reduction, by training the network to ignore insignificant data or blend data together. The Texture DB 1235 may be used to store all the texture information such as the name, color maps, diffuse maps, bump, specular and normal maps, along with other information pertaining to textures.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention is herein disclosed by way of examples and should not be limited by the particular disclosed embodiments described above. The present embodiments are, therefore, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A method comprising:
receiving, by a computing device having a processor and addressable memory, one or more user input data from a set of input capture devices for a virtual environment including a set of items;
determining, by the computing device, whether user input data received from multiple users conflicts with each other, wherein the received user input data of each user of the multiple users is associated with an item of the set of items in the virtual environment and wherein conflict is determined based on the received user input data from two or more users being associated with a selected item;
determining, by the computing device, a real time editing consensus for a determined conflict via resolving which user input data associated with a particular user to accept and which user input data to discard, the resolving being based on a set of criteria;
optimizing, by the computing device, the selected item of the set of items wherein the optimized version of the selected item from the set of items is received from a 2D/3D optimizer thereby taking up less memory, as compared to a non-optimized version of the selected item, while retaining or improving visual realism of the selected item;
modifying, by the computing device, the virtual environment based on the determined real time editing consensus and the optimized selected item of the set of items, wherein the modifying is based on receiving multiple user inputs requesting movement and changes to items in the virtual environment; and
determining, by the computing device, a virtual environment rendering including different textures and objects in real time based on the modified virtual environment being optimized for displaying on an output device, thereby providing a browser based virtual environment editor running on the computing device.

2. The method of claim 1, wherein determining a real time editing consensus is based on a set of criteria comprising at least one of: latency stats associated with each user of the multiple users and user-environment authorization or permission associated with each user of the multiple users.

3. The method of claim 2, wherein the associated user latency stats are used to determine whether certain actions by users are unreliable.

4. The method of claim 3, wherein determining whether certain actions by users are unreliable is based on reliability and unreliability of a user connection according to network factors.

5. The method of claim 3, wherein the user-environment authorization or permissions are used to determine permissions of users and their access to make modifications to objects or scenes.

6. The method of claim 5, further comprising: determining whether to invalidate certain user actions based on the unreliability of a user connection and the user-environment authorization or permissions of users and their access to make modifications to objects or scenes.

7. The method of claim 1, wherein the input capture devices comprise at least one of: mouse, keyboard, VR controller, and augmented reality input.

8. The method of claim 1, wherein optimizing the selected item of the set of items is based on at least one of: reducing polygon count of 3D Model for the item and creating realistic looking textures for the item.

9. The method of claim 1, wherein determining the virtual environment is further based on at least one of: masking any parts of a scene that are not within view of a user view lens and predicting portions of a scene that have not yet loaded.

10. The method of claim 1, wherein the received user input data from two or more users being associated with a selected item is for the same item.

11. A system comprising:
an input capture component configured to:
receive one or more user input data for virtual environment including a set of items, wherein the input capture devices comprise at least one of: mouse/keyboard/VR controller and augmented reality input;
a real time editing consensus component configured to:
determine whether user input data has been received from multiple users wherein the input data is associated with an item of the set of items that is the same as another item of the set of items in the virtual environment and wherein the input data results in a conflict with each other; and
determine for a resulted conflict a real time editing consensus via resolving which input associated with a particular user to accept and which input to discard, the resolving based on a set of criteria;
a 2D/3D items optimizer component configured to:
optimize the item of the set of items wherein the optimized version of the item from the set of items takes up less memory while retaining or improving visual realism of the item;
an environment modification component configured to:
modify the virtual environment based on the determined real time editing consensus and the optimized item of the set of items, wherein the modification is based on receiving multiple user inputs requesting movement and changes to items in the virtual environment; and
a virtual environment rendering component configured to:
determine a virtual environment rendering including different textures and objects in real time based on the modified virtual environment being optimized for displaying on an output device.

12. The system of claim 11, wherein the set of criteria to determine a real time editing consensus comprises at least one of: latency stats associated with each user of the multiple users and user-environment authorization or permission associated with each user of the multiple users.

13. The system of claim 12, wherein the associated user latency stats are used to determine whether certain actions by users are unreliable.

14. The system of claim 13, wherein to determine whether certain actions by users are unreliable is based on reliability and unreliability of a user connection according to network factors.

15. The system of claim 13, wherein the user-environment authorization or permissions are used to determine permissions of users and their access to make modifications to objects or scenes.

16. The system of claim 15, wherein the real time editing consensus component is further configured to: determine whether to invalidate certain user actions based on the unreliability of a user connection and the user-environment authorization or permissions of users and their access to make modifications to objects or scenes.

17. The system of claim 11, wherein the 2D/3D items optimizer component is further configured to: optimize the item of the set of items based on at least one of: reduce polygon count of 3D Model for the item and create realistic looking textures for the item.

18. The system of claim 11, wherein the virtual environment rendering component is further configured to: determine the virtual environment based on at least one of: mask any parts of a scene that are not within view of a user view lens and predict portions of a scene that have not yet loaded.

19. The system of claim 11, wherein the input data results in a conflict with each other when the received user input data from two or more users is associated with the same selected item.

20. A computing device having a processor and addressable memory, wherein the processor is configured to:
receive one or more user input data for a virtual environment including a set of items from a set of input capture devices;
determine whether user input data has been received from multiple users wherein the input data is associated with an item of the set of items that is the same as another item of the set of items in the virtual environment, and wherein the input data of the multiple users results in a conflict with each other;
determine a real time editing consensus via resolving which input associated with a particular user to accept and which input to discard, the resolving based on a set of criteria;
optimize the item of the set of items wherein the optimized version of the item from the set of items is received from a 2D/3D optimizer thereby taking up less memory, as compared to a non-optimized version of the selected item, while retaining or improving visual realism of the item;
modify the virtual environment based on the determined real time editing consensus and the optimized item of the set of items, wherein the modification is based on receiving multiple user inputs requesting movement and changes to items in the virtual environment; and
determine a virtual environment rendering including different textures and objects in real time based on the modified virtual environment that is optimized for displaying on an output device, thereby providing a browser based virtual environment editor running on the computing device.

* * * * *